May 2, 1933.  S. C. HOARE  1,906,596
MEASURING INSTRUMENT
Filed Aug. 3, 1931

Inventor:
Stephen C. Hoare;
by Charles E. Jullar,
His Attorney.

Patented May 2, 1933

1,906,596

UNITED STATES PATENT OFFICE

STEPHEN C. HOARE, OF LYNN, MASSACHUSETTS, ASSIGNOR TO GENERAL ELECTRIC COMPANY, A CORPORATION OF NEW YORK

MEASURING INSTRUMENT

Application filed August 3, 1931. Serial No. 554,733.

My invention relates to electrical measuring instruments and particularly to instruments of the opposed-element type.

One of the principal objects of my invention is the provision of a standard of electromotive force as a substitute for the standard cell in potentiometric work. Another object is the provision of a standard of current. Still another object of my invention is the provision of a signal or control relay sensitive to minute changes in current or voltage. Other and further objects will be apparent from the description.

In carrying out my invention I combine two instruments of the deflecting type, following different laws expressing the relationship between the torque and current, by mechanically connecting their moving elements in such a manner that their effects are opposed. The constants are so chosen that the torque effects will exactly balance when a predetermined value of current or of voltage is being measured, so that for such a value no deflection will take place.

For example, I may provide one unit in which the torque is directly proportional to the current such as a d'Arsonval galvanometer, and a second unit in which the torque is proportional to the square of the current, such as a dynamometer or hot wire instrument.

Figure 1:
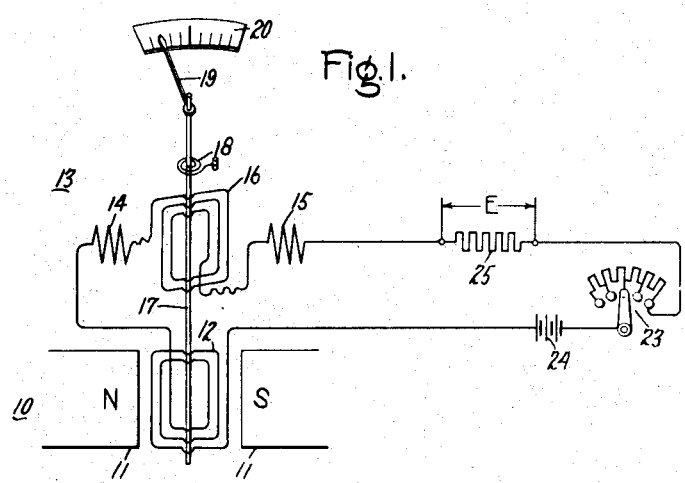
Figure 2:
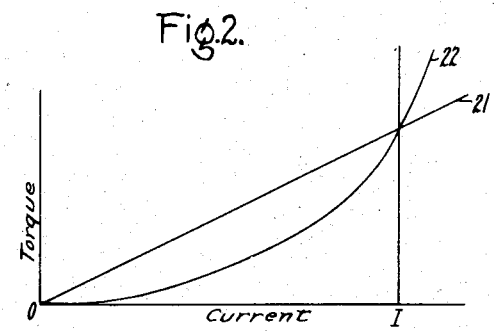
Figure 3:
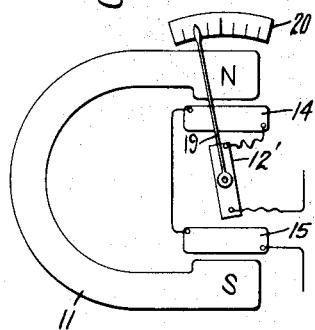
Figure 4:
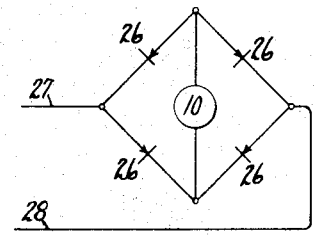

The features of my invention which are believed novel and patentable will be pointed out in the claims appended hereto. For a better understanding of my invention reference may be had to the following description and the drawing appended thereto, in which Fig. 1 represents schematically a circuit for providing a standard of electromotive force, employing an instrument having opposing units in accordance with one embodiment of my invention; Fig. 2 illustrates the current-torque curves of the d'Arsonval, and the dynamometer type units; Fig 3 represents a modified form of instrument in which a single moving coil is acted upon by the fields from two stationary elements tending to oppose each other, and following different current-torque curves; and Fig. 4 represents the circuit of a rectifier d'Arsonval which may be used in connection with the measurement or control of alternating current circuits.

In accordance with the embodiment of my invention disclosed in Fig. 1, I combine the unit 10, of the d'Arsonval type, having a field structure consisting of the permanent magnet 11 and having a moving coil 12, with the unit 13 of the dynamometer type having its field produced by the fixed coils 14 and 15 and having a moving coil 16. The moving coils 12 and 16 are attached to the same shaft 17 and are connected so as to oppose each other in tending to produce rotation of the shaft 17. The shaft 17 is biased to a neutral position by the hair spring 18, and is provided with a pointer 19 and scale 20 to indicate deviations from the neutral position.

Units 10 and 13 are connected in series so that the same current flows through each. Since the d'Arsonval unit 10 follows a substantially linear current-torque curve 21, Fig. 2, and the dynamometer unit 13 follows a substantially parabolic current-torque curve 22, the effect of the d'Arsonval unit 10 will predominate for values of current less than .01, and that of the dynamometer unit 13 will predominate for values of current greater than .01. But for a value of current equal to .01 the curves intersect and the two effects will be equal and opposite so that the pointer 19 will remain at 0 when the current equals .01. My device therefore serves as a current standard, and by manipulating the rheostat 23 to keep the pointer 19 at 0 the current produced by the battery 24 in the circuit disclosed in Fig. 1 may be kept constant at the value .01. Obviously by a suitable change in the constants of one or both of the units 10 and 13 my device would serve as a standard for any other desired value of current.

My device may be used as a standard of electromotive force and a substitute for the standard cell by employing in the circuit a resistor 25, having a zero temperature coefficient of resistance. If the current flowing through the fixed resistor 25 is kept constant by keeping the pointer 19 at 0, the drop in potential E across the fixed resistor 25 will also remain constant. The potential difference E may therefore be used for standardizing purposes in a manner analogous to the use of standard cells.

It will be understood that the compound instrument constituting the subject of my invention may also take the form of a contact making device.

In Fig. 3, I have illustrated a modified form of the device disclosed in Fig. 1. In this modification a single moving coil 12' is subject to the influence of the field of the permanent magnet 11, causing it to act as in a d'Arsonval instrument, and is also subject to the field produced by the coils 14 and 15 causing the moving coil 12' to act as in a dynamometer instrument. The field coils 14 and 15 are connected so that they tend to oppose the permanent magnet 11. The moving and stationary coils are connected in series. Consequently the same result is accomplished as in the arrangement shown in Fig. 1.

Although I have chosen to illustrate the principle of my invention by an instrument of the d'Arsonval-dynamometer type, my invention is not restricted to the use of elements of this specific type.

My device may be adapted to alternating current work by substituting for the d'Arsonval element a "saturated" type of soft-iron instrument, a rectifier d'Arsonval, or any other type of alternating current instrument in which torque is substantially a linear function of current.

Fig. 4 illustrates an arrangement whereby the d'Arsonval unit may be used with alternating current circuits. The d'Arsonval unit 10 is connected with the full wave rectifier formed by suitable rectifier units 26, and the leads 27 and 28 are brought out in place of the leads of the moving coil 12 as shown in Fig. 1.

Furthermore my invention is not limited to the use of units following torque curves which vary with the first and second powers of the current respectively, but obviously includes units following torque curves which are any other function of current provided the two respective curves are different and intersect at a point within the range of the instrument.

Although I have chosen to explain my invention by illustrating an instrument of the deflecting type, my invention obviously also includes devices in which the members act as opposing plungers, devices of the balance type, as well as others employing the principle of opposing members having different curves of current plotted against current effect.

It will be understood that where high permanent accuracy is desired precautions should be taken to employ properly aged permanent magnets when used in the instrument, to shield the instrument from stray fields and the fields of two opposed instruments from each other when necessary, to provide any necessary temperature compensation, to select the balanced torque point at a stable sensitive angle of deflection and to take such other precautions as are consistent with the design of precision electrical measuring instruments.

In accordance with the provisions of the patent statutes, I have described the principle of operation of my invention together with the apparatus which I now consider to be the best embodiment thereof, but I desire to have it understood that the apparatus shown is only illustrative and that the invention may be carried out by other means.

What I claim as new and desire to secure by Letters Patent of the United States, is:

1. In an instrument responsive to the magnitude of an electrical quantity, a moving element, means reacting with said moving element with a force proportional to said electrical quantity and means reacting with said moving element with an opposing force proportional to the square of said electrical quantity, said reacting means being so arranged with respect to said moving element that deflection of the moving element produces like effects on both the opposing forces and they become equal in magnitude at only one point within the range of the instrument.

2. In an instrument responsive to the magnitude of an electrical quantity, a moving element, means reacting with said moving element with a force proportional to a given power of said electrical quantity and means reacting with said moving element with an opposing force proportional to a different power of said electrical quantity, said reacting means being so arranged with respect to said moving element that deflection of the moving element produces like effects on both the opposing forces and they become equal in magnitude at only one point within the range of the instrument.

3. In combination with an electric circuit in which a current flows, a current responsive instrument having a moving element provided with a pair of coils connected in series relation in said circuit and stationary field producing means cooperating with said coils for producing simultaneously increasing opposing torques proportional to different functions of the current flowing in said circuit, said coils being so arranged with respect to said field-producing means that the effect of angular deflection is to increase or decrease simultaneously the torques acting so that there is only one point within the range of the instrument at which the opposing torques become equal.

4. In an instrument responsive to the magnitude of an electrical quantity, a moving element provided with members carrying currents varying in response to variations in said electrical quantity, stationary elements reacting with said members respectively, with forces opposite in direction, one of which is a given function of said electrical quantity, and the other of which is a different function of said electrical quantity, said movable members being so arranged with respect to said stationary elements that deflection of the moving element produces like effects on both the opposing forces acting and they become equal in magnitude at only one point within the range of the instrument.

5. In combination with an electrical circuit in which current flows, a current responsive instrument having a moving element provided with a pair of coils connected in series relation in said circuit, and stationary elements reacting upon said coils, with forces opposite in direction, and proportional to different functions of the current flowing in said circuit, so as to modify the scale law followed by the instrument said coils being so arranged with respect to said stationary elements that the effect of angular deflection is to increase or decrease simultaneously the torques acting so that there is only one point within the range of the instrument at which the opposing torques become equal.

6. A current responsive electrical instrument comprising stationary and moving parts for simultaneously producing opposing torques proportional to different functions of the same quantity, one of said parts including means for producing a fixed magnetic field reacting with the other part and means reacting oppositely upon said other part for producing a magnetic field varying in response to variations in the measured quantity, said torques being equal at one point in the range of the instrument, and a spring for determining the position of the moving part when said torques are equal.

7. In a measuring instrument, the combination of opposing force producing units each responsive to the quantity to be measured and each comprising a pair of relatively movable cooperating elements, one of the elements of one of said units comprising means for producing a magnetic field of fixed strength and the remaining elements comprising means for producing magnetic fields varying in strength in response to variations in the measured quantity.

8. In an instrument responsive to the magnitude of an electrical quantity, a moving element comprising means carrying current proportional to said quantity, a stationary element including means for producing a magnetic field of fixed strength reacting with said current in the moving element and means for producing a magnetic field varying in strength with variations in said electrical quantity and reacting oppositely with said current in the moving element.

9. In combination with a circuit carrying a current to be standardized, a standard of current comprising two opposing instrument units, each responsive to the current in said circuit and having stationary and moving elements, the moving elements being mechanically attached to each other, one of said units having elements tending to produce motion in one direction with a force which is a given function of the current flowing, the other of said units having elements tending to produce motion in the opposite direction with a force which is a different function of the current flowing, said stationary elements being so arranged with respect to said moving elements that the deflection of the moving elements produces like effects on both the opposing forces and they become equal in magnitude at only a given scale position for which the current flowing has the value for which the instrument is designed to be a standard.

10. In an instrument responsive to the magnitude of an electrical quantity, a current carrying moving element, a field structure comprising a permanent magnet cooperating with said moving element to produce a force varying as a function of said electrical quantity, a second field structure comprising an electrical winding cooperating with said moving element to produce an opposing force varying as a different function of said electrical quantity, the relative field strengths of said field structures being such and the field structures being so arranged with respect to the moving element that deflection of the moving element produces like effects on both the opposing forces and they become equal in magnitude at a single point within the range of the instrument.

11. A standard of potential difference comprising in combination with an electrical circuit, an instrument of the opposed unit type, and a resistance of substantially zero temperature coefficient included in said circuit, said instrument having opposing units designed to exactly counter-balance each other at a value of current which causes a drop in potential in said zero temperature coefficient resistance equal to the value for which the device is standard.

In witness whereof I have hereunto set my hand.

STEPHEN C. HOARE.

CERTIFICATE OF CORRECTION.

Patent No. 1,906,596.  May 2, 1933.

STEPHEN C. HOARE.

It is hereby certified that error appears in the printed specification of the above numbered patent requiring correction as follows: Page 1, line 17, strike out the word "the"; lines 77, 79, 80, 83, and 89, for ".01" read "01"; and that the said Letters Patent should be read with these corrections therein that the same may conform to the record of the case in the Patent Office.

Signed and sealed this 13rd day of June, A. D. 1933.

M. J. Moore.

(Seal)  Acting Commissioner of Patents.